(12) United States Patent
Zhang et al.

(10) Patent No.: US 7,218,808 B2
(45) Date of Patent: May 15, 2007

(54) EQUALIZER CIRCUIT FOR A LIGHT SOURCE

(75) Inventors: Ying Zhang, Singapore (SG); Qi Jie Wang, Singapore (SG); Yeng Chai Soh, Singapore (SG)

(73) Assignee: Agency for Science, Technology and Research, Centros (SG)

( * ) Notice: Subject to any disclaimer, the term of this patent is extended or adjusted under 35 U.S.C. 154(b) by 121 days.

(21) Appl. No.: 10/938,243

(22) Filed: Sep. 9, 2004

(65) Prior Publication Data

US 2006/0051012 A1  Mar. 9, 2006

(51) Int. Cl.
*G02B 6/26* (2006.01)
*H04B 10/12* (2006.01)

(52) U.S. Cl. .......................... 385/27; 385/15; 398/149

(58) Field of Classification Search ................ None
See application file for complete search history.

(56) References Cited

U.S. PATENT DOCUMENTS

| | | | |
|---|---|---|---|
| 5,142,660 A | 8/1992 | Chang et al. | |
| 5,191,627 A * | 3/1993 | Haas et al. | 385/24 |
| 6,172,995 B1 | 1/2001 | Yang | |
| 6,384,964 B1 | 5/2002 | Mizuno | |
| 6,400,870 B1 * | 6/2002 | Hill et al. | 385/39 |
| 6,570,659 B2 | 5/2003 | Schmitt | |

* cited by examiner

*Primary Examiner*—Sung Pak
(74) *Attorney, Agent, or Firm*—Merchant & Gould P.C.

(57) ABSTRACT

An optical equalizer circuit for a light source, the optical equalizer circuit comprising M optical couplers linked by differential delay lines, wherein coupling ratios for the respective M optical couplers of the equalizer circuit are calculated based on an input signal from the light source and a designed profile the optical input is to be equalized to.

16 Claims, 9 Drawing Sheets

EQUALIZER CIRCUIT FOR A LIGHT SOURCE

FIELD OF THE INVENTION

The present invention relates to an optical equalizer circuit for a light source, to a method of designing an optical equalizer circuit for a light source, and to a light source structure.

BACKGROUND

Broadband light sources with high output power are used in many optical communication applications that require a high output power over a wide wavelength spectrum. In wavelength division multiplexing (WDM), a broadband light source is cascaded with a comb filter and a modulator to provide various wavelengths of light signals to code information. In yet another example, broadband light sources are used in the testing and measurement of photonics components and devices.

There are two categories of broadband light sources, with both categories having a basic structure comprising a light emitting source, a spectrum equalizer and an isolator.

In the first category, illustrated in FIG. 1, the broadband light source is created by using Amplified Spontaneous Emission (ASE) brought about through the use of Erbium Doped Fiber Amplifiers (EDFA) 23. The EDFA 23 can be pumped in a forward manner 28, in a backward manner 22, or both the forward and backward manner 28 and 22. Examples of prior art which use broadband light sources of this category include U.S. Pat. No. 6,172,995 issued to Yang on 9 Jan. 2001 and U.S. Pat. No. 5,142,660 issued to Chang et al on 25 Aug. 1992. However, broadband light sources of the first category seldom deliver an output power bigger than 10 dBm over a 70 nm 3-dB bandwidth.

In the second category, illustrated in FIG. 2, light from a Light Emitting Diode (LED) 11 which is driven by a diode driver 10 is coupled into a fiber 13 and outputs through fiber 14 after an isolator 15. A Super Luminance Emitting Diode (SLED) or an Edge Luminance Emitting Diode (ELED) can be used instead of a normal LED 11. For instance, U.S. Pat. No. 6,570,659 issued to Schmitt on 27 May 2003 uses multiple SLEDs 30$a$, 30$b$, . . . 30$n$ to form a broadband source as shown in FIG. 3. The light from the plurality of SLEDs is coupled into a polarization combiner 33, where the light is attenuated with different ratios, before it is combined for output 34. By choosing appropriate attenuation ratios, the final output light 34 of the broadband light source gains a wide spectrum. Broadband light sources of the second category are able to provide several tens of mW of output power over a 100 nm 3 dB bandwidth.

However, the light spectrums emitted from the broadband light sources of the above two categories are usually not flat. For high precision optical signal processing, the output spectrum of a broadband light source should ideally be as flat as possible over a wide range of wavelengths. As such, there is a need to equalise the output spectrums of the broadband light sources of the above two categories.

Equalizing of the output spectrum can be done in several ways, such as through the use of optical tunable filters. Another way to equalize the output spectrum is through the use of a Mach-Zehnder Interferometer (MZI), as described in U.S. Pat. No. 6,384,964 issued to Mizuno, et al on 7 May 2002.

When SLEDs and ELEDs are used in a broadband light source (as in the case of the second category of broadband light sources described above), the need for spectrum equalization becomes a cause of concern as the SLEDs and the ELEDs normally have a Gaussian-like profile.

Although a flat spectrum can be achieved by combining several SLEDs with different attenuation ratios as described in U.S. Pat. No. 6,570,659, the central wavelengths of the SLEDs used have to be close enough to each other to output a flat spectrum. More SLEDs will have to be used if a flatter and wider spectrum is required, resulting in an increase in the complexity of the diode driver circuitry required. This increases the cost of the broadband light sources.

Further an increase in the number of SLEDs also gives rise to higher insertion loss at the attenuator, thus diminishing the advantage of having a high output power when more SLEDs are used.

Most available spectrum equalizers have a specific effective spectrum equalizing range that corresponds to the spectrum of an optical amplifier, such as the EDFA, used in the broadband light source. These spectrum equalizers will have a different spectrum range from that of the SLEDS, and more importantly, they are not designed with a minimal attenuation. Thus, such equalizers will not prove useful to equalize the Gaussian-like spectrum of the SLED with a pre-specified spectral flatness and high output power.

There is thus a need to have an equalizer that can yield a flat output spectrum over a wide bandwidth, while a small number of SLEDs are used.

SUMMARY OF THE INVENTION

In accordance with a first aspect of the present invention, there is provided a method of designing an optical equalizer circuit comprising M optical couplers linked by differential delay lines, the method comprising:

conducting a spectrum analysis of an optical input signal;

deriving one or more substantially Gaussian functions to approximate the optical input signal;

calculating coupling ratios for the respective M optical couplers of the equalizer circuit based on the Gaussian functions and a designed profile the optical input is to be equalized to.

The calculating of the coupling ratios may comprise formulating a matrix transfer function of the equalizer circuit defining conditions for a transmission of the approximated input signal through the optical equalizer circuit based on the matrix transfer function and the designed profile; and deriving the coupling ratios by solving an optimisation based on the conditions.

The M couplers may comprise 2×2 couplers, and the calculating of the coupling ratios may comprise formulating a normalised bar-state power transfer function for the optical equalizer circuit as a function of coupling ratios of the M couplers;

defining conditions for a bar-state transmission of the approximated input signal through the optical equalizer circuit based on the normalised bar-state power transfer function and the designed profile;

deriving the coupling ratios by solving en optimisation based on the conditions.

The deriving of the substantially Gaussian functions to approximate the optical input signal may comprise using a least-squares method of a measurement in the spectrum analysis of the optical input signal.

The deriving of the substantially Gaussian functions to approximate the optical input signal may comprise using a polynomial of a measurement in the spectrum analysis of the optical input signal.

In accordance with a second aspect of the present invention, there is provided an optical equalizer circuit for a light source, the optical equalizer circuit comprising M optical couplers linked by differential delay lines, wherein coupling ratios for the respective M optical couplers of the equalizer circuit are calculated based on an input signal from the light source and a designed profile the optical input is to be equalized to.

The optical input signal may be approximated by one or more substantially Gaussian functions.

The optical equalizer optical equalizer circuit may comprise an unbalanced Mach-Zehnder Interferometer (MZI).

The unbalanced MZI may comprise M couplers linked by differential delay lines.

The coupling ratios of the respective couplers may be chosen based on the designed profile.

The physical length of the differential delay between the M couples may be the same.

The designed profile may comprise a substantially flat spectral response.

A bandwidth of the substantially flat spectral response may be a first parameter of the designed profile, and intensity over said bandwidth may be a second parameter of the designed profile, and the designed profile may be based on maximizing the first and/or the second parameters.

The optical equalizer circuit may comprise an optical fiber equalizer circuit and the M couplers comprise fiber couplers.

The LEDs may comprise Super Luminance Emitting Diodes (SLED) or an Edge Emitting Diode (ELED).

In accordance with a third aspect of the present invention, there is provided a light source structure comprising:

an optical equalizer circuit;

a light emitting diode (LED) having a substantially Gaussian-like emission profile, wherein an optical output of the LED is coupled to an input port of the optical equalizer circuit; and wherein the optical equalizer circuit is designed such that the substantially Gaussian-like emission profile is equalized into a designed profile.

The optical equalizer structure may comprise an unbalanced Mach-Zehnder Interferometer (MZI).

The unbalanced MZI may comprise M couplers linked by differential delay lines.

The coupling ratios of the respective couplers may be chosen based on the designed profile.

The physical length of the differential delays between the M couples may be the same.

The structure may comprise a plurality of LEDs having respective substantially Gaussian-like emission profiles, wherein optical outputs of the LED are coupled as an optical input signal to the input port of the optical fiber equalizer circuit; and wherein the optical equalizer circuit is designed such that the optical input signal is equalized into a designed profile.

The designed profile may comprise a substantially flat spectral response.

A bandwidth of the substantially flat spectral response may be a first parameter of the designed profile, and intensity over said bandwidth may be a second parameter of the designed profile, and the designed profile may be chosen based on maximizing the first and/or the second parameters.

The optical equalizer circuit may comprise an optical fiber equalizer circuit, and the M couplers may comprise fiber couplers.

The LEDs may comprise Super Luminance Emitting Diodes (SLED) or an Edge Emitting Diode (ELED).

BRIEF DESCRIPTION OF THE DRAWINGS

This present invention is now described by way of non-limiting examples, with reference to the accompanying drawings, in which.

DETAILED DESCRIPTION

Figure 1:
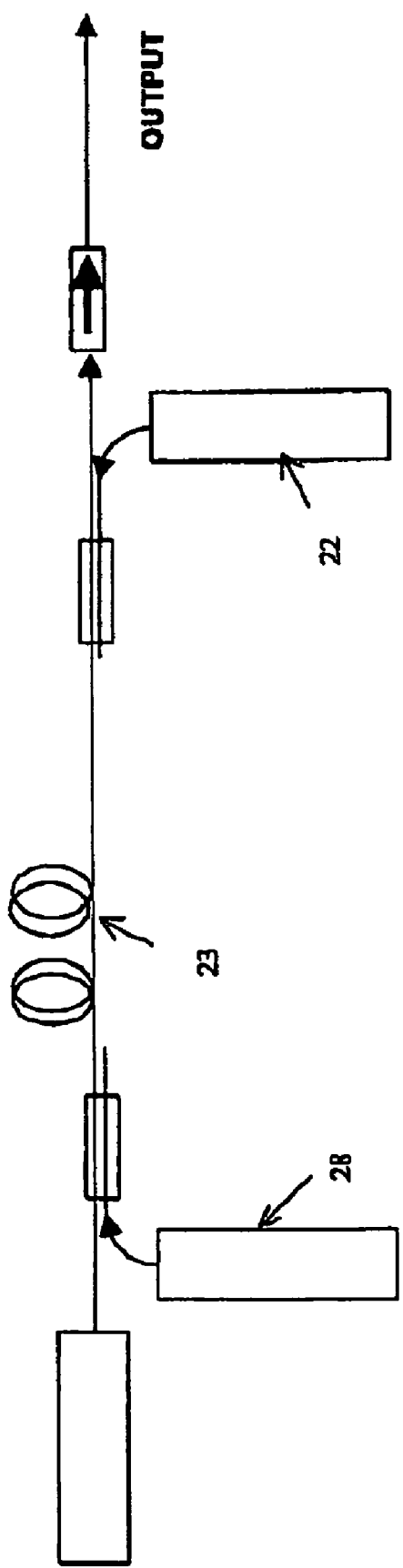
FIG. 1 illustrates a broadband light source achieved through optical amplification according to the prior art
Figure 2:
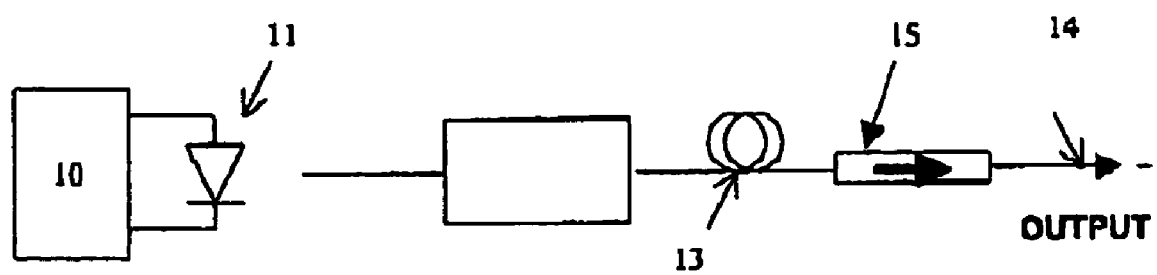
FIG. 2 illustrates a broadband light source using a LED achieved according to the prior art
Figure 3:
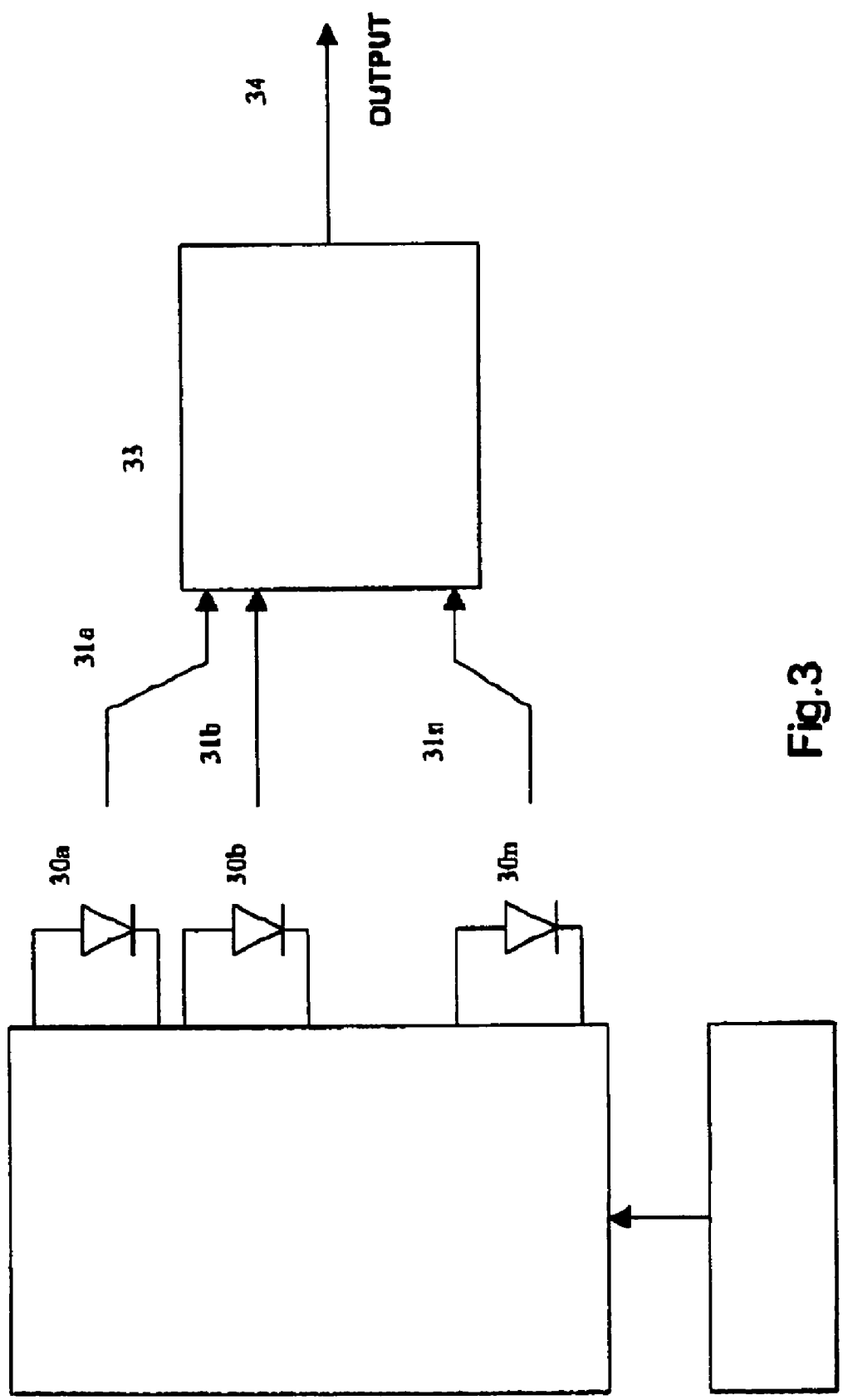
FIG. 3 illustrates a broadband light source according to U.S. Pat. No. 6,570,659
Figure 4:
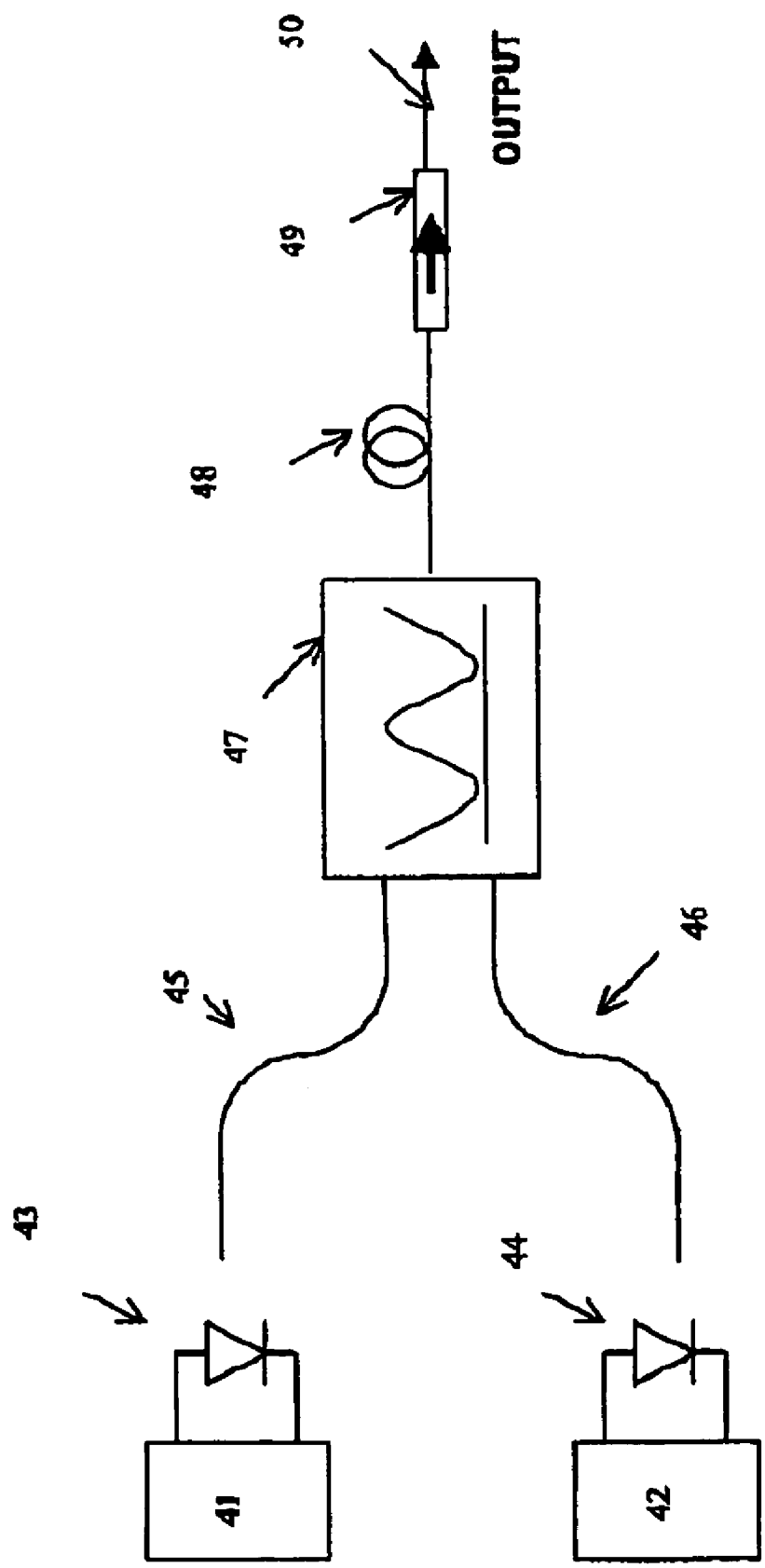
FIG. 4 illustrates a broadband light source according to one embodiment of the present invention

FIG. 4 shows a broadband light source according to one embodiment of the present invention. Two fiber pigtailed light diodes 43 and 44 are respectively connected through fibers 46 and 46 to input ports of an all-fiber spectrum equalizer 47. The output port of the all-fiber spectrum equalizer 47 is connected to a single mode fiber 48. The single mode fiber 48 is then connected to an optical isolator 49 and the optical isolator 49 outputs the light through the output port 50. In this embodiment, SLEDs or ELEDs may be used as the light diodes 43 and 44.

If more than two light diodes are used to increase the output power of the broadband light source, the equalizer 47 should take an N×N structure. Instead of using the 2×2 structure in the example embodiment. In this case, the equalizer 47 is fabricated by linking N×N fiber couplers with differential time delay lines. By choosing appropriately the differential delay lengths and the coupling ratios, an equalizer spectrum can still be obtained by using the method presented in this disclosure.

Figure 6:
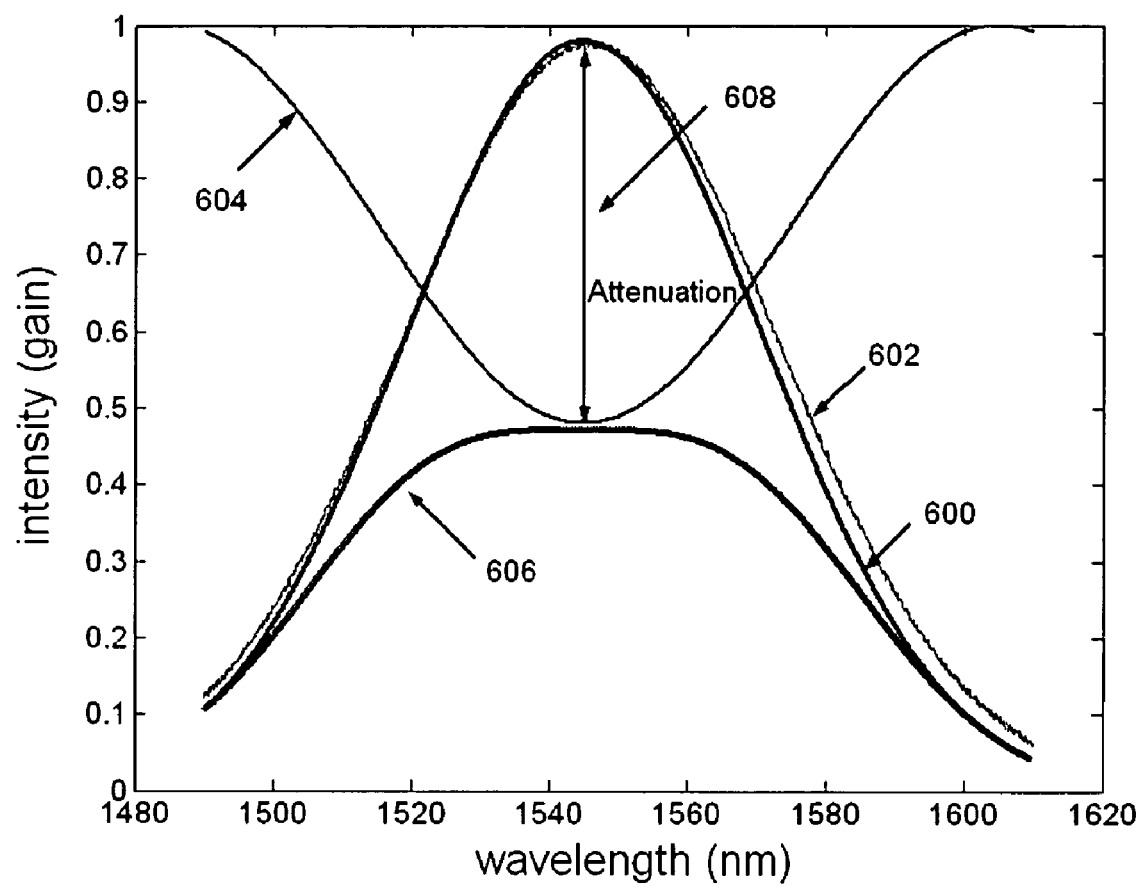
FIG. 6 illustrates various output spectrums used in the design of a spectrum equalizer according to one embodiment of the invention

The output spectrums of the light diodes 43 and 44 have a Gaussian-like profile denoted as "Original SLED Spectrum" (see curve 602 in FIG. 6). This Gaussian-like profile has to be equalised which is achieved through the all-fiber spectrum equalizer 47 (FIG. 4) in the example embodiment.

Figure 5:
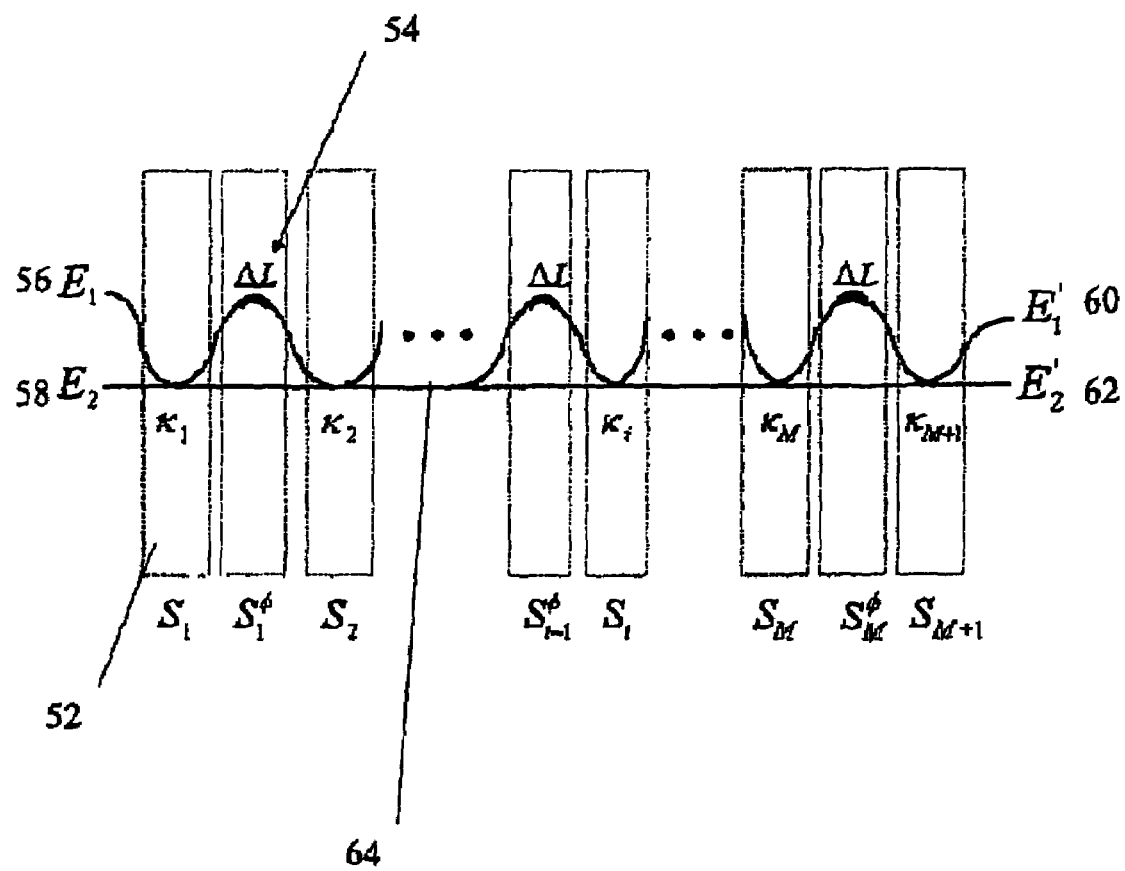
FIG. 5 illustrates a spectrum equalizer according to one embodiment of the present invention

The all-fiber spectrum equalizer 47 is an unbalanced Mach-Zehnder Interferometer (MZI), as illustrated in FIG. 5, comprising M fiber couplers, e.g. 52, linked by differential time delay lines, e.g. 54. Optical input signal from SLED or ELED 43 (FIG. 4) is coupled to the first input port 56 of the spectrum equalizer 47. The other optical input from SLED or ELED 44 (FIG. 4) is connected to the second input port 58 of the equalizer 47.

The equalization is achieved in two steps, and will be described below initially for a single Gaussian-like input profile.

In the first step, an analytic Gaussian function F, curve 600 in FIG. 6, is used to approximate the "Original SLED Spectrum", curve 602 in FIG. 6. The analytic Gaussian function F is expressed as $F=Pe^{-(w-w_0)/2s^1}$, where $\omega_0$ denotes the central wavelength, P the amplitude and δ the derivation of the analytic Gaussian function F. The approximation can be done by applying a least-squares method on the measurement of the Gaussian-like profile of the "Original SLED Spectrum"

In the second step, an equalization filter E, with the desired spectrum curve 604 as shown in FIG. 6, has to be designed. In the example embodiment, the equalization filter E is designed to meet two requirements. Firstly, when the equalization filter E is applied to the analytic Gaussian function F, the equalized spectrum E·F is as flat as possible over a wavelength band, as denoted "Overall SLED Spectrum after Equalization" curve 606 in FIG. 6. Secondly, the output spectrum after equalization should have as small as possible attenuation, indicated at numeral 608 in FIG. 6, which will result in a small insertion loss and in turn the equalized light source can deliver a high output power.

Such an equalization filter E is achieved in the example embodiment using an 2×2 M-th order MZI all-fiber filter with M fiber couplers, that equals to an M−1-stage MZI. This MZI all-fiber filter is formed by linking M 2×2 fiber couplers e.g. 52 with unit differential time-delay lines, e.g. 54, as shown in FIG. 5. Denoting the electric field at the i-th input port and the i-th output port respectively as $E_i$ and $E_i'$ (for i=1,2), the normalized electric fields transfer function from the two inputs 56, 58 to the two outputs 60, 62 can be expressed by the following matrix transfer function $$\begin{pmatrix} E_1' \\ E_2' \end{pmatrix} = \prod_{i=M-1}^{i} S_{i+1} S_i^\phi S_i \begin{pmatrix} E_1 \\ E_2 \end{pmatrix}$$

where $S_i$ and $S_i^\Phi$ respectively denote the transmission of the i-th fiber coupler and the i-th differential time delay line. $S_i$ and $S_i^\Phi$ are given respectively by $$S_i = \begin{pmatrix} c_i & -js_i \\ -js_i & c_i \end{pmatrix} \text{ and}$$

$$S_i^\phi = \begin{pmatrix} e^{-jw} & 0 \\ 0 & e^{jw} \end{pmatrix}$$

where $c_i=\sqrt{\kappa_i}$, $s_i=\sqrt{1-\kappa_i}$, $\kappa_i$ is the bar-state intensity coupling ratio of the i-th 2×2 fiber coupler from its first input port to its first output port, $\omega=\Delta L\pi n/(2\lambda)$, $\Delta L$ is the physical length of the differential delay, $\lambda$ is the wavelength of the wave propagating through free space and n is the refracted index of the optical fiber 64. In this embodiment, $\Delta L$ between any of the M 2×2 fiber couplers, e.g. 52, is chosen to have the same value, as shown in FIG. 5.

The transfer functions with respect to the bar-state (from $E_1$, 56, to $E_1'$, 60) and cross-state (from $E_1$, 56, to $E_2'$, 62) is denoted as $T_{1,1}^M$ and $T_{1,2}^M$, respectively. The bar-state power transfer function $E_{1,1}^M$ is given by $T_{1,1}^M \cdot (T_{1,1}^M)^*$, where $(T_{1,1}^M)^*$ is the complex conjugate of $T_{1,1}^M$. The bar-state power transfer function $E_{1,1}^M$ can then be expressed by a combination of $\cos(2(k-1)w)$ as $$E_{1,1}^M = \sum_{k=1}^{M} a_{k,M} \cos(2(k-1)w)$$

where $a_{k,M}$ (for k=1,2, . . . , M) are the bar-state power expansion coefficients that are the combinations of the design parameters $c_i$ and $s_i$ (for i=1,2, . . . , M). Similarly, the cross-state power transfer function $E_{1,2}^M$ can be expressed by a combination of $\cos(2(k-1)\omega)$ as $$E_{1,2}^M = \sum_{k=1}^{M} f_{k,M} \cos(2(k-1)w)$$

where $f_{k,M}$ (for k=1,2, . . . , M) are the cross-state power expansion coefficients that are the combinations of the design parameters $c_i$ and $s_i$ (for i=1,2, . . . , M). M is the number of fiber couplers of the designed filter, i.e. M=2 corresponds to a single-stage MZI.

To obtain a flat spectral response, the first 2M derivatives of the transmission $E_{1,1}^M \cdot F$ with respect to $\omega$ at $\omega=0$ shall be zero. Using the chain rule, the q-th order derivative of $E_{1,1}^M \cdot F$ can be obtained as:

$$\frac{d^q(E_{i,1}^M \cdot F)}{d^q w}\bigg|_{w=0} = \qquad (A)$$

$$\sum_{i=0}^{q} \binom{q}{l} \frac{d^{q-1}(E_{i,1}^M)}{d^{q-1}w} \frac{d^j(F)}{d^l w} = 0. \text{ for } q = 1, 2, \ldots 2M.$$

If two light diodes are used, one is connected at 56 and another at 58, the output light can be taken from one of the output ports either 60 or 62 (compare FIG. 5). For this scenario, two Gaussian functions, denoted by $F_1$ and $F_2$ respectively, are used to approximate the output spectrums of the two diodes. The equation corresponding to (A) is obtained as follows:

$$\frac{d^q(E_{i,1}^M \cdot F_1 + E_{2,1}^M \cdot F_2)}{d^q w}\bigg|_{w=0} = \qquad (B)$$

$$\sum_{i=0}^{q} \binom{q}{l} \frac{d^{q-1}(E_{i,1}^M)}{d^{q-1}w} \frac{d^l(F_1)}{d^l w} + \sum_{i=0}^{q} \binom{q}{l} \frac{d^{q-1}(E_{2,1}^M)}{d^{q-1}w} \frac{d^l(F_2)}{d^l w} =$$

$$0 \text{ for } q = 1, 2, \ldots 2M.$$

In the scenario of extending to more than two light sources, the changes corresponding to (A) can be shown as $$\left.\frac{d^q\left(\sum_{i=1}^{s} E_{i,1}^M \cdot F_i\right)}{d^q w}\right|_{w=0} = \quad (C)$$

$$\sum_{i=1}^{s}\left(\sum_{l=0}^{q}\binom{q}{l}\frac{d^{q-1}(E_{1,2}^M)}{d^{q-1}w}\frac{d^l(F_i)}{d^l w}\right) = 0 \text{ for } q = 1, 2, \ldots 2M$$

where s is the number of input light sources. $E_{1,1}$ and $F_1$ represent the i-th power transfer function (from the i-th input port to the 1-th output port) and i-th analytic Gaussian function for approximating the output spectrum of the i-th light diode, respectively.

Representing the first M−1 unknown coefficient s of $\alpha_{k,M}$ by a vector $v=[\alpha_{1,M}, \alpha_{2,M}, \ldots, \alpha_{M-1,M}]$, the desired coefficients that enable a flat spectrum and a high output power can be obtained by solving an optimization given by $$\max\{e^T v + \alpha_{k,M}\}$$

subject to constraints given by $-\frac{1}{2} \leq \alpha_{k,M} \leq 0$ and the equations in (A) respectively, where $\epsilon$ denotes a M−1 dimensional vector $e^T=[1,1,\ldots,1]$. Therefore, the desired parameters can be obtained as $\alpha_{k,M}=-\frac{1}{2}$ and the vector v can be expressed as $v=\frac{1}{2}A^{-1}\alpha$, where the matrix A and the vector $\alpha$ are respectively given by $$A = \begin{pmatrix} \frac{1}{\delta^1} & 2^2 + \frac{1}{\delta^1} & \cdots & (2M-4)^2 + \frac{1}{\delta^2} \\ \frac{3}{\delta^2} & 2^2 + \delta\frac{2^2}{\delta^2} + \frac{3}{\delta^4} & \cdots & (2M-4)^2 + 6(2M-4)^2\frac{1}{\delta^2} + \frac{3}{\delta^2} \\ \vdots & \vdots & \ddots & \vdots \\ \frac{\prod_{i=1}^{M-1}(2i-1)}{\delta^{2(M-1)}} & \sum_{i=0}^{M-1}\frac{2^{2(M-i-1)}\prod_{i=1}^{1}(2i-l)}{\delta^2 \delta^{2(M-1)}} & \cdots & \sum_{i=0}^{m-1}\binom{2(M-1)}{2l}\frac{(2M-4)^{2(M-i-1)}}{\delta^{2i}}\prod_{i=1}^{1}(2i-1) \end{pmatrix}$$

and $$a = \left[(2M-2)^2 + \frac{1}{\delta^2}(2M-2)^2 + 6(2M-2)^2\frac{1}{\delta^2} + \frac{3}{\delta^2} \cdots \sum_{i=0}^{M-1}\binom{2(M-2)}{2l}\frac{(2M-2)^{2(M-i-1)}}{\delta^{2i}}\prod_{i=1}^{M-1}(2i-1)\right]$$

To calculate the desired fiber coupling ratios from $E_{1,1}^M$, all coefficients $\alpha_{k,M}$ for k=1,2,..., M are normalized after solving the optimization based on equation (A). The normalization can be done by $$a'_{i,M} = a_{k,M} \Big/ \sum_{i=1}^{M} |a_{i,M}|.$$

Substituting the normalized coefficients, a normalized power transfer function $E_{1,1}^M$ is obtained by which a synthesis algorithm, similar to the one described in "Synthesis of coherent two-port lattice-form optical delay-line circuit" by K. Jinguji and M. Kawachi, IEEE J. Lightwave Technol., Vol. 13, pp. 73–82, 1995, is employed to calculate the design parameters $c_i$ and $s_i$ for i=1,2,..., M. The difference between the synthesis algorithm used in this embodiment and that of Jinguji et al. is that all of the coefficients of $T_{1,1}^M$ are real numbers because of the structural characteristics of the MZI in the equalizer 47 shown in FIG. 5.

The synthesis algorithm used in this embodiment consists of two steps.

In the first step, the bar-state amplitude coefficients of $T_{1,1}^M$ are solved from the normalized power transfer function $E_{1,1}^M$ via is spectral factorization, with power transfer function $E_{1,1}^M$ obtained by solving the optimization based on equation (A).

In the second step, a cross-state transfer function $T_{1,2}^M$ (from $E_1$, 56, to $E'_2$, 62) is calculated by using the power conservation law given by $T_{1,1}^M T_{1,1}^{M*} + T_{1,2} T_{1,2}^* = 1$. Using the transfer functions $T_{1,1}^M$ and $T_{1,2}^M$, all the coupling ratios of the fiber couplers in the spectrum equalizer can be obtained by $$\theta_n = -\arctan\left(\frac{d_{n,r}}{b_{n,k}}\right)$$

$$b_{k,n-1} = (b_{k+1,n}\cos(\theta_n) - d_{k+1,n}\sin(\theta_n))$$

$$d_{k,n-1} = (b_{k,n}\sin(\theta_n) + d_{k,n}\cos(\theta_n))$$

for k=1,2,..., n, and where $b_{k,n}$ and $d_{k,n}$ respectively are the k-th coefficients of the bar-state and cross-state amplitude transmissions $T_{1,1}^M$ and $T_{1,2}^M$ in the n-th recursive steps. The initial value of n starts from M, where $b_{k,n}$ and $d_{k,n}$ are obtained from the first three steps in the synthesis algorithm.

Figure 7:
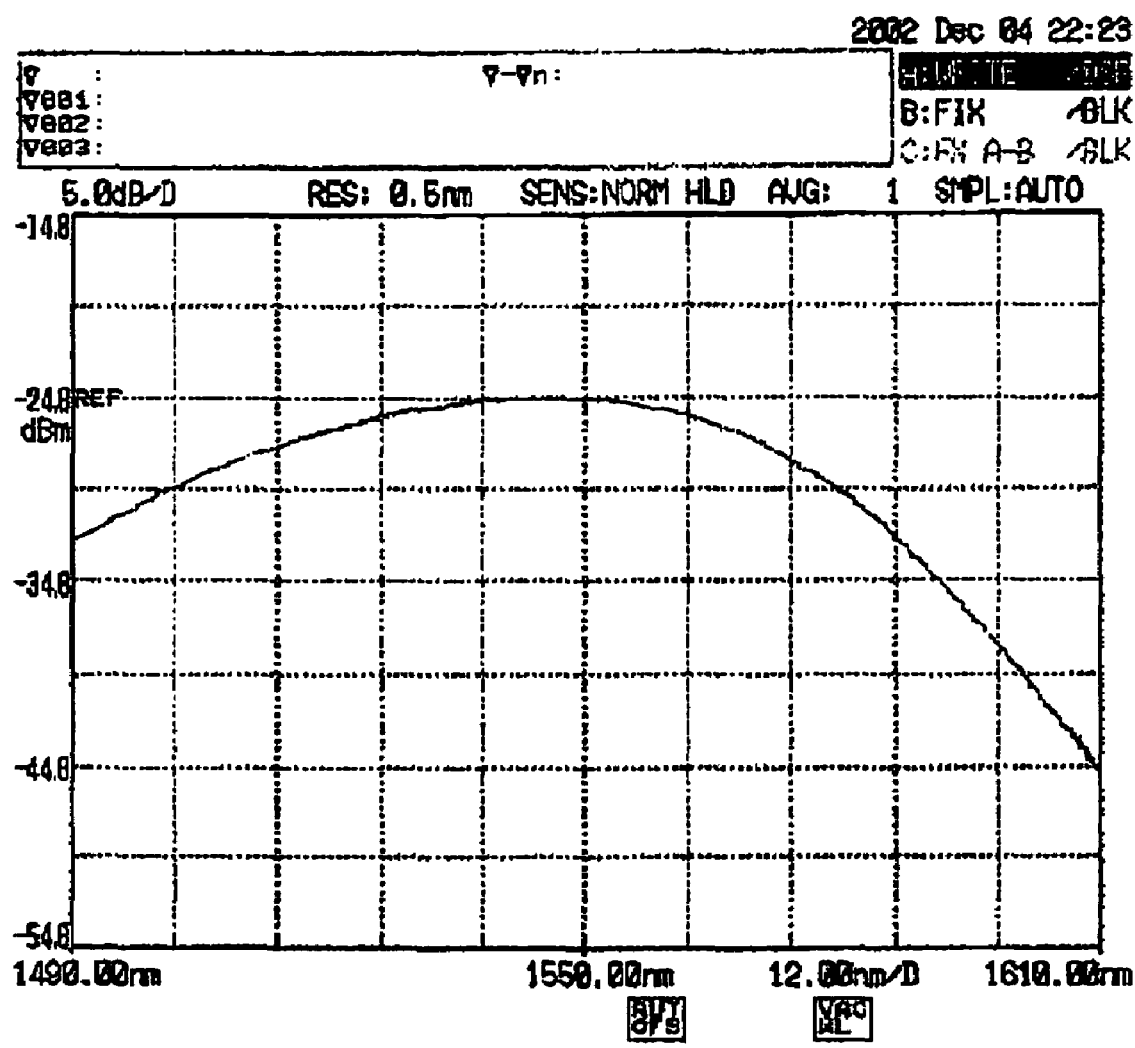
FIG. 7 illustrates an output spectrum of a single SLED without equalization
Figure 8:
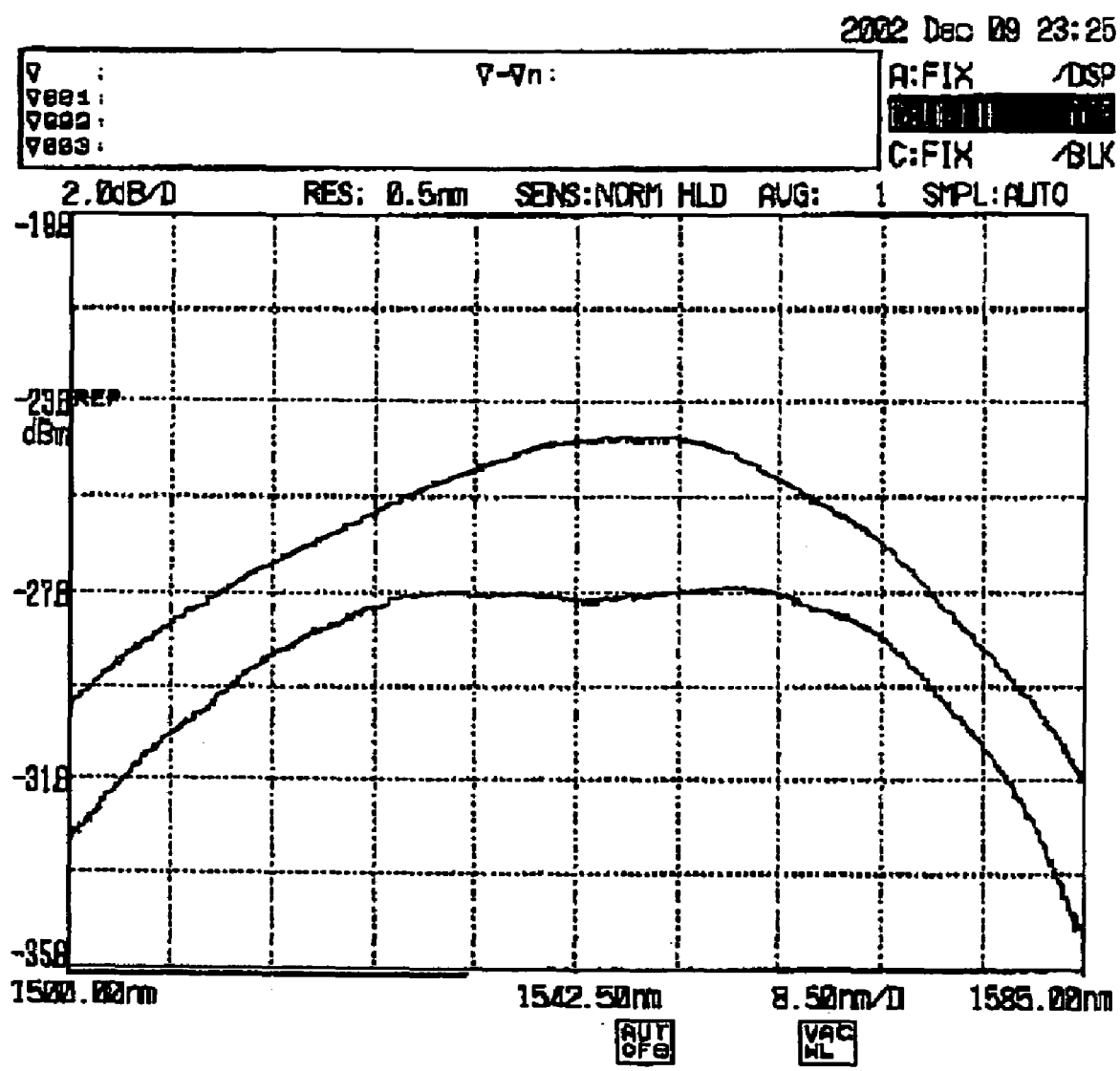
FIG. 8 illustrates an output spectrum of a single SLED after equalization according to an embodiment of the present invention.

FIG. 7 shows the Gaussian-like output spectrum of a SLED before passing through a spectrum equalizer. In comparison, FIG. 8 shows output spectrum of the SLED after it passes through the spectrum equalizer 47 in an example embodiment. The spectrum equalizer 47 used to produce the output spectrum shown in FIG. 8 is a MZI consisting of two fiber couplers designed according to the embodiment of the MZI all-fiber filter described above. The equalized spectrum has less than 0.1 dB ripple over a 35 nm bandwidth. If a 3 dB passband is considered in FIG. 8, the flat portion of the output spectrum has a bandwidth of about 68 nm.

Figure 9:
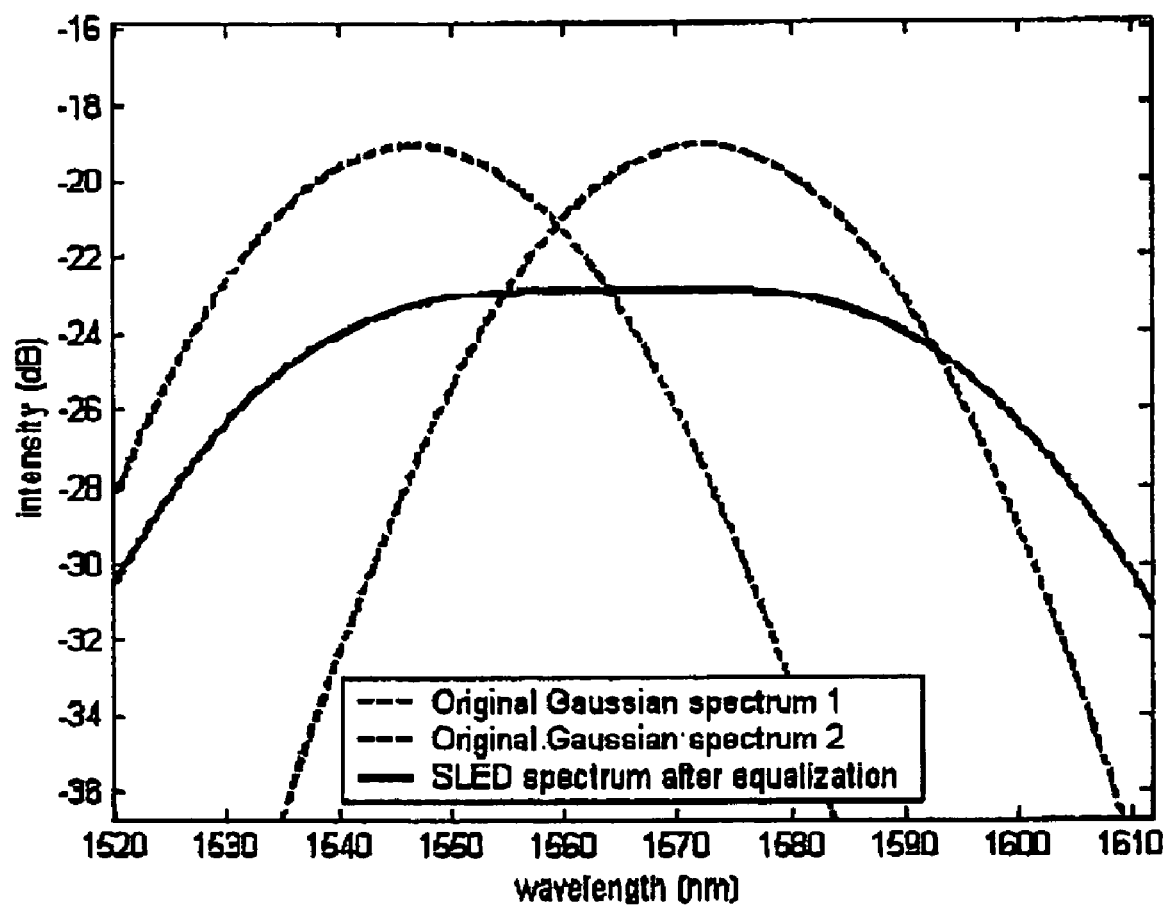
FIG. 9 illustrates output spectrums of two SLEDs after equalization according to an embodiment of the present invention.

FIG. 9 illustrates output spectrums of two SLEDs after equalization according to an embodiment of the present invention.

In another embodiment of the invention, the equalizer 47 can be a planar waveguide circuit. The light sources 41 and 42 used can also be two pigtailed SLEDs or ELEDs.

A broadband light source according to embodiments of the invention delivers higher output light power over a wide bandwidth compared to the broadband light sources using conventional ASE. Fewer SLEDs can also be used.

Further, through the use of an all-fiber unbalanced MZI as the equalizer 47, the insertion loss is greatly reduced.

With reference to the two steps involved in the design of the embodiment of the all fiber spectrum equalizer 47 described above, these two steps provide an efficient and quantitative approach to design optical filters to flatten Gaussian-like profile spectrums.

Spectrum ripples after equalization result mainly from the approximation error in the first step. However, a substantially flat output spectrum will be achieved after the second step is performed. Further, it is sufficient to approximate the spectrum to be equalized by using a polynomial. The polynomial is then used to calculate the coupling ratios of all fiber couplers in the unbalanced MZI interferometer.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

The invention claimed is:

1. An optical equalizer circuit for a light source, the optical equalizer circuit comprising M optical couplers linked by differential delay lines, wherein
coupling ratios for the respective M optical couplers of the equalizer circuit are calculated based on an approximation function representing an input signal from the light source and a filter profile designed such that the approximation function is filtered to provide an optical output signal from the optical equalizer circuit satisfying an optimisation of a maximum bandwidth of a flat portion of the output signal and a maximum output power.

2. The optical equalizer circuit as claimed in claim 1, wherein the optical input signal is approximated by one or more substantially Gaussian functions.

3. The optical equalizer circuit as claimed in claim 1, wherein the optical equalizer circuit comprises an unbalanced Mach-Zehnder interferometer (MZI).

4. The optical equalizer circuit as claimed in claim 3, wherein the unbalanced MZI comprises M couplers linked by differential delay lines.

5. The optical equalizer circuit as claimed in claim 4, wherein the coupling ratios of the respective couplers are chosen based on the designed filter profile.

6. The optical equalizer circuit as claimed in claim 4, wherein the physical length of the differential delay between the M couples is the same.

7. The optical equalizer circuit as claimed in claim 1, wherein the optical equalizer circuit comprises an optical fiber equalizer circuit, and the M couplers comprise fiber couplers.

8. The optical equalizer circuit as claimed in claim 1, wherein the LEDs comprise Super Luminance Emitting Diodes (SLED) or an Edge Emitting Diode (ELED).

9. A light source structure comprising:
an optical equalizer circuit;
a light emitting diode (LED) having a substantially Gaussian-like emission profile, wherein an optical output of the LED is coupled to an input port of the optical equalizer circuit; and
wherein the optical equalizer circuit comprises M optical couplers linked by differential delay lines, and coupling ratios for the respective M optical couplers of the equalizer circuit are calculated based on an approximation function representing the emission profile of the LED and a filter profile designed such that the approximation function is filtered to provide an optical output signal from the optical equalizer circuit satisfying an optimisation of a maximum bandwidth of a flat portion of the output signal and a maximum output power.

10. The structure as claimed in claim 9, wherein the optical equalizer structure comprises an unbalanced Mach-Zehnder interferometer (MZI).

11. The structure as claimed in claim 10, wherein the unbalanced MZI comprises M couplers linked by differential delay lines.

12. The structure as claimed in claim 11, wherein the coupling ratios of the respective couplers are chosen based on the designed filter profile.

13. The structure as claimed in claim 11, wherein the physical length of the differential delays between the M couplers are the same.

14. The structure as claimed in claim 9, comprising
a plurality of LEDs having respective substantially Gaussian-like emission profiles, wherein optical outputs of the LEDs are coupled as an optical input signal to the input port of the optical fiber equalizer circuit;
the approximation function represents a profile of the combined optical outputs of the LEDs; and
wherein the optical equalizer circuit comprises M optical couplers linked by differential delay lines, and coupling ratios for the respective M optical couplers of the equalizer circuit are calculated based on the approximation function representing the profile of the combined optical outputs of the LEDs and a filter profile designed such that the approximation function is filtered to provide an optical output signal from the optical equalizer circuit satisfying an optimisation of a maximum bandwidth of a flat portion of the output signal and a maximum output power.

15. The structure as claimed in claim 9, wherein the optical equalizer circuit comprises an optical fiber equalizer circuit, and the M couplers comprise fiber couplers.

16. The structure as claimed in claim 9, wherein the LEDs comprise Super Luminance Emitting Diodes (SLED) or an Edge Emitting Diode (ELED).

* * * * *